Jan. 2, 1962 P. J. NATHO Re. 25,109
SURFACE CONTROLLED SUBSURFACE TUBING
PRESSURE SHUT-OFF VALVE
Original Filed Sept. 24, 1954 2 Sheets-Sheet 1
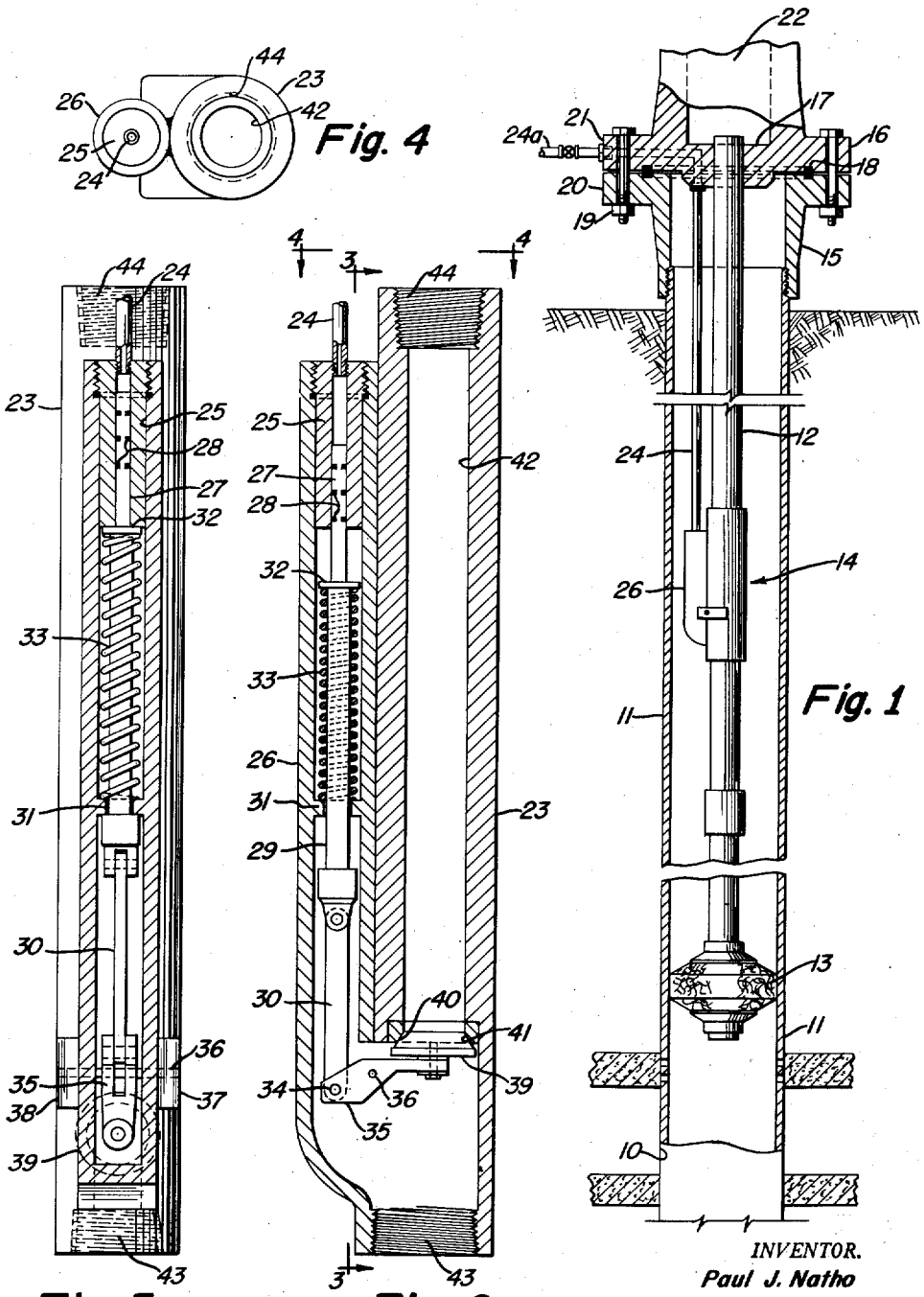
INVENTOR.
Paul J. Natho
BY Everett A. Johnson
ATTORNEY INVENTOR.
Paul J. Natho
BY Everett A. Johnson
ATTORNEY United States Patent Office Re. 25,109
Patented Jan. 2, 1962

25,109

SURFACE CONTROLLED SUBSURFACE TUBING PRESSURE SHUT-OFF VALVE

Paul J. Natho, Houston, Tex., assignor to Pan American Petroleum Corporation, a corporation of Delaware Original No. 2,780,290, dated Feb. 5, 1957, Ser. No. 458,230, Sept. 24, 1954. Application for reissue July 26, 1957, Ser. No. 675,514
5 Claims. (Cl. 166—72)

Matter enclosed in heavy brackets [ ] appears in the original patent but forms no part of this reissue specification; matter printed in italics indicates the additions made by reissue.

This invention relates to means for controlling flow from a producing well and, more particularly, to a surface-controlled shut-off valve.

During the past several years permanent type well completions have been adopted by many in oil or gas well completions. The term "permanent well completion" refers to the technique wherein the tubing and well head are installed and remain installed during the life of the well. A tubing-to-casing packer is set above all producing horizons of multiple sands in oil or gas wells and all completion and workover operations are conducted through the tubing. Hence, the tubing string and other subsurface equipment are placed while the drilling rig is on location, but the permanent completion technique permits the removal of the rig prior to such operations as cement squeeze, acidizing, perforating, testing, and the like. These operations can be performed later with wire line units and other subsurface equipment devised for this purpose without the use of the conventional workover rig. In such re-completions or workovers, it is necessary to lower several hundred and perhaps a thousand feet of small diameter pipe through the tubing.

Since it is desirable to conduct these operations without loading the well with mud or other fluid, the insertion of the small diameter pipe, called an extension, is accomplished under atmospheric pressure after an expendable plug has been inserted in the bottom of the tubing. In prior operations, this plug is later removed by building up the tubing pressure and expelling it. Thus, once removed it cannot be replaced and, therefore, it would be impossible to withdraw the extension from the tubing except by first loading the well with fluid. Further, it is necessary to dispose of the expendable plug which is in the well below the bottom of the tubing string. Hence, heretofore, it has not been possible to take the full advantage of the "permanent well completion" technique since the shut-off means has been expendable and not replaceable.

It is therefore, an object of this invention to provide apparatus which may be applied to conventional tubing strings which will eliminate the necessity of having to load the well with fluid and of having to snub the extension string of tubing into the well. Another object of the invention is to provide a shut-off means for use in wells which require occasional or emergency closure of the tubing at some point below the surface of the ground. Another object of the invention is to provide a pressure-control valve which can be operated from the surface. An additional object of the invention is to provide a flow-control apparatus which is particularly adapted for use in conjunction with the workover of completed wells. These and other objects of my invention will become apparent as the description thereof proceeds.

In general, I attain the objects of my invention by equipping a conventional tubing string with a surface-controlled valve which can be used to remove the pressure within the string of tubing. The valve is inserted in the tubing string at a sufficient depth to permit the insertion or removal of the small diameter tubing or extension under atmospheric pressure when my valve is closed thereby limiting the pressure of the formation to that portion of the tubing below the valve. The opening and closing of the valve is accomplished by the application of hydraulic pressure to a small piston of approximately 0.375 inch in diameter through a small parallel string of pipe or tubing attached to the rig tubing and extending through the well head.

Normal operation of the valve comprises applying pressure to the hydraulic cylinder by way of the small parallel string and thereby placing the flapper or plug of the valve in the closed position after which tubing pressure is released above it. When it is desired to open the valve, the differential pressure on the plug, which tends to hold it in the closed position, can be equalized by applying pressure from the casing or from an outside source. This is not a disability to my system since even when a well is equipped with a packer, the casing and tubing pressures are equalized through a control port near the packer which is opened during the rework operations.

By using several control mechanism connected to a surface pilot valve for actuating the hydraulic mechanism, I may automatically actuate the subsurface tubing valve in order to obtain an automatic shut-off of the tubing valve in the event of an emergency.

Further details and advantages of my invention will be described by reference to the accompanying drawings wherein:

FIGURE 1 is a schematic view of a section of well casing and tubing employing my subsurface shut-off valve;

FIGURE 2 is an enlarged section of the shut-off valve shown in FIGURE 1 with the valve closed;

FIGURE 3 is a section taken along the line 3—3 in FIGURE 2 but with the valve open;

FIGURE 4 is a plan view taken along the line 4—4 in FIGURE 2; and

Figure 5:
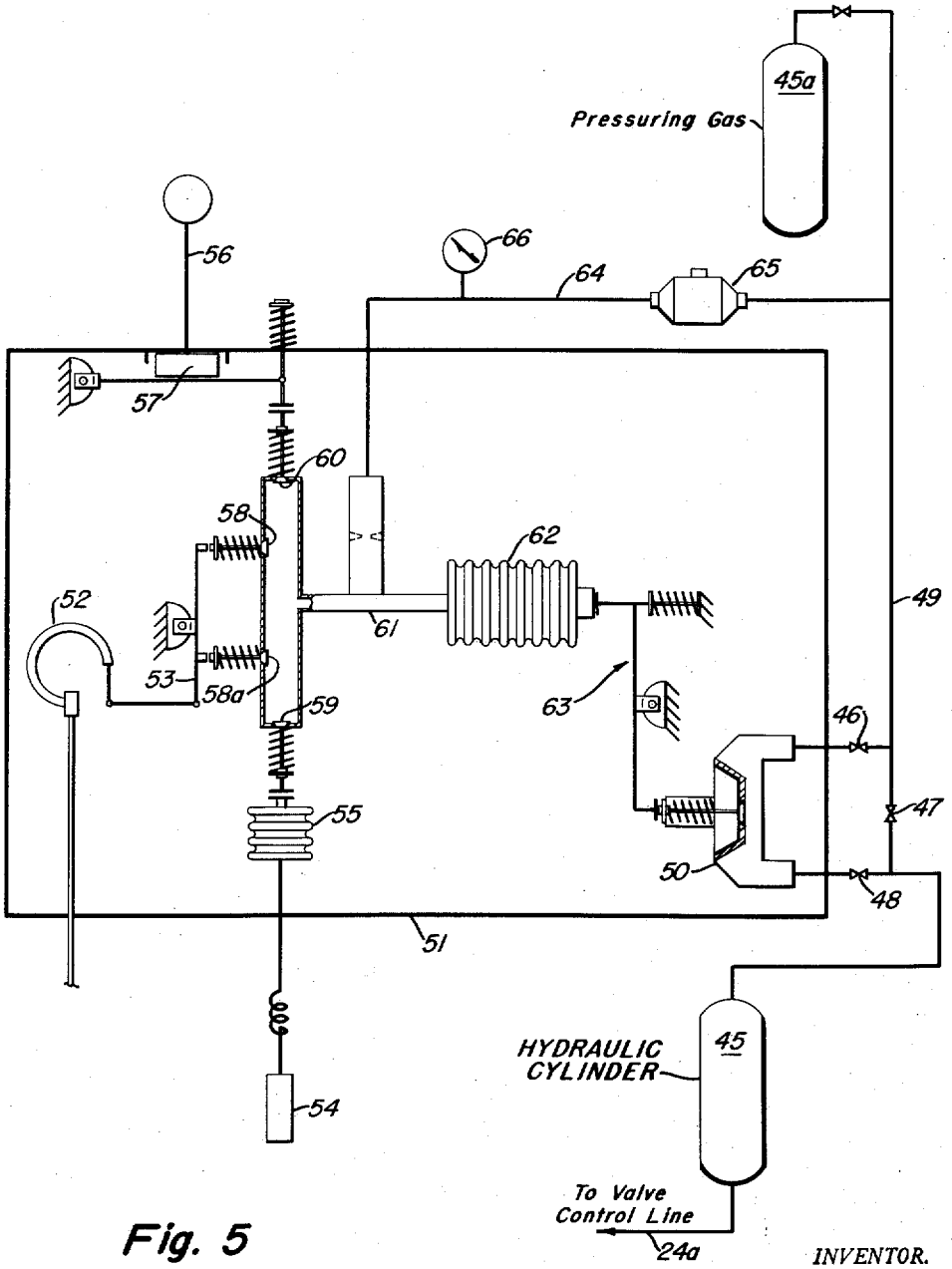
FIGURE 5 is a schematic illustration of a controller system for automatically actuating the subsurface tubing valve.

Referring to FIGURE 1, a well bore 10 is provided with a casing 11 and tubing 12. A packer 13 isolates the annular space between the tubing 12 and the casing 11 in a conventional manner. My shut-off valve 14 is placed on the tubing 12 at the required depth. The usual well head equipment is provided which may, for example, include a casing head 15 and a plate or cap 16, which is bolted to a flange upon the casing head 15 in the usual manner, provided with a central boss 17 and a sealing gasket 18 such as an O-ring. Bolts 19 secure the flanges 20 and 21 of the casing head 15 and casing cap 16 in a fluid-tight manner. The upper end of the flow line or tubing 12 discharges above the cap 16 into a master valve housing 22, and the valve therein (not shown) may be used to control the flow through the upper end of the tubing 12. The casing head 15 may be equipped with lateral ports and valves (not shown) so that fluid may be introduced into or allowed to flow from the casing 11 above the packer 13.

A hydraulic line 24 passes through the cap 16 into the valve cylinder 25. The cylinder 25 is threaded at its upper end into the pocket 26. Within the cylinder 25 is a plunger 27 provided with a plurality of O-rings 28. The plunger 27 is integral with an actuating rod 29 which is threaded at its lower end to a pivoted linkage 30. Shoulder 31 within the pocket 26 and annular shoulder 32 on the rod 29 act as stops for a spring 33. The spring 33 has sufficient strength to raise the plunger or piston 27 against the fluid head in the hydraulic line 24 extending to the surface.

The linkage 30 is pivoted by pin 34 to flapper arm 35.

The flapper arm 35 in turn is pivotally mounted by shaft 36 extending through the walls of the pocket 26 and journaled in bosses 37 and 38. The flapper 39 is provided with a bevelled seating surface 40 which is adapted to engage the valve seat 41 at the inlet to the cylinder chamber 42 in the housing 23. At either end of the housing 23 I provide tubing threads 43 and 44 for securing intermediate sections of tubing 12.

In normal operation, the shut-off valve 14 is open with the flapper valve 39 in the position shown and with the spring 33 in its extended position shown in FIGURE 3. However, upon the application of hydraulic pressure to the plunger 27 within the cylinder 25 by line 24 the rod 29 is forced downwardly whereby the flapper arm 35 is caused to rotate about the shaft 36 bringing the flapper valve 39 onto its seat 40. The hydraulic pressure on line 24 retains the shut-off valve 14 in this closed position, but it will be understood that the pressure differential on opposite sides of the flapper valve 39 also tends to retain the shut-off valve 14 in a closed position until pressure is applied in the tubing 12 above the valve 14 for equalizing the pressure across the flapper 39.

Referring to FIGURE 5, the hydraulic line 24a communicates with valved line 24 in FIGURES 1 to 3 and pressure is applied to the hydraulic cylinder 45 by means of a gas from supply reservoir 45a. By manipulation of valves 46, 47 and 48, the pressuring of cylinder 45 can be controlled manually.

If automatic operation is desired, I provide in gas line 49 a regulator valve 50 which is responsive to a number of pressure-actuated elements forming part of automatic controller 51. Within the automatic controller 51 I have illustrated a Bourdon tube 52, which may be applied to a flow line, controls linkage 53, a temperature bulb 54 which is exposed to the ambient temperature actuates the bellows 55, and a wind-responsive vane 56 acts through linkage 57 to open valves 58—58a, 59, or 60 to bleed gas from the housing 61 so as to contract the valve-actuating bellows 62 and thereby control the regulator valve 50 through linkage 63 which in turn controls the flow of pressurizing gas to the cylinder 45a and ultimately the pressure of the hydraulic fluid in line 24 and on plunger 27 in cylinder 25. The controller gas is fed into the housing 61 via line 64 having pressure regulator 65 and, if desired, a pressure gauge 66.

The various valves 58, 58a, 59 and 60 associated with the pressure, temperature and wind-responsive elements 52, 54 and 56 are opened against their associated springs so as to bleed out controller gas from the housing 61 thereby permitting the pressure bellows 62 to retract and through linkage 63 open the regulator valve 50. This effects the automatic closing of the flapper 39 in shut-off valve 14 as described above. It will be understood that the shut-off valve 14 is automatically re-set when the pressure on the cylinder 45 is released, the spring 33 serving to retract the plunger 27, pivot the flapper arm 35 and open the flapper valve 39, as shown in FIGURE 3.

The controller 51 described above will through valve 60 automatically actuate the subsurface tubing valve 14 in the event of a flow line break, fire, or if winds of hurricane velocity become prevalent. Other arrangements are contemplated whereby other controls can be used to automatically close the tubing valve 14. For instance, where an off-shore well is located on a platform in the tide lands, the tubing shut-off valve 14 can be remotely controlled with microwave transmitters and receivers. Such would be useful in the event of violent wave action. It is also contemplated that a wave-responsive device can be added to the controller 51. In any event, I have provided a number of means responsive to ambient and climatic conditions for automatically controlling the subsurface valve 14 under emergency conditions.

By the use of the tubing which has been described, it is possible to handle the tubing in the usual manner in ating and flowing the well, but if occasion arises where it is desired to shut off the flow for any reason that can be done conveniently and safely and as many times as necessary during the life of the well.

Although I have described my invention with particular reference to a preferred embodiment of the invention, it should be understood that this is by way of illustration only. Other modifications and techniques will become apparent to those skilled in the art and can be made without departing from the spirit and scope of the invention.

What I claim is:

1. A control valve for use on subsurface tubing and controllable from the surface exterior of said tubing which comprises in combination an elongated housing, tubing threads at both ends of said housing for connecting said housing between spaced lengths of tubing, a flow channel extending substantially the entire length of said housing, the cross-sectional flow area of said channel being approximately equivalent to that of said tubing, a tubular pocket disposed laterally of said flow channel and fixed to the exterior of said housing, an enlargement in said housing below said flow channel providing a communication port between said channel and said tubular pocket, a flapper closure means pivotally mounted within said enlargement and movable across the lower end of said flow channel, longitudinally extending rod means movable within said pocket, a linkage connecting the lower end of said rod means with said pivoted closure means, a plunger means at the upper end of said rod means, *said plunger means and said pocket forming a pressure chamber,* [a sleeve type cylinder threaded into the upper end of said pocket and accommodating said plunger means, spring means below said cylinder and within said pocket, an annular shoulder intermediate the ends of said pocket providing a stop for said spring means, said] spring means normally raising said plunger means in said [sleeve] *pocket* and urging said closure to an open position through said linkage, remotely controlled hydraulic controller means in fluid connection with said [cylinder] *pressure chamber* in said pocket, whereby application of hydraulic pressure to said plunger means compresses said spring and seats said closure in a shut-off position at the lower end of said flow channel, the said remote controller being automatically actuated in response to changes in temperature, pressure and wind velocity at the wellhead.

2. A control valve for use on subsurface tubing and controllable from the surface exterior of said tubing without the aid of mechanical linkages which comprises in combination an elongated housing, tubing threads at both ends of said housing for connecting said housing between adjacent lengths of subsurface tubing, a flow channel extending over a substantial length of said housing, the cross-sectional flow area of said channel being approximately equivalent to that of said tubing, a port at the lower end of said channel comprising a valve seat, a tubular pocket disposed laterally of said flow channel and substantially coextensive with the length of said housing, an enlargement in said housing below said flow channel providing a valve chamber below the lower end of said flow channel and communicating with said tubular pocket, a threaded closure for the upper end of said tubular pocket, pivoted flapper closure means mounted within said valve chamber and movable across the valve seat on the lower end of said flow channel, *a plunger within said tubular pocket, said tubular pocket and said plunger forming a pressure chamber,* [longitudinally extending rod means movable within said pocket and terminating therewithin] a linkage connecting the lower end of said [rod means] *plunger* with said pivoted flapper closure means, [a plunger means comprising the upper end of said rod means, a sleeve type cylinder within the upper end of said pocket within which said plunger means operates, said cylinder comprising an integral extension of said closure at the upper end of said housing, spring means below said cylinder within said pocket, an annular shoulder on the rod means subjacent to said plunger means and a second shoulder carried by the walls of said pocket intermediate the ends thereof providing stop means for said spring means, said] spring means normally raising said plunger [means] in said [sleeve] *pocket* and urging said flapper closure means to an open position through said linkage, hydraulic line means connected to said [cylinder and passing through said] *threaded* closure at the upper end of said pocket, remote control means for actuating said plunger through said hydraulic line means, and means responsive to environmental conditions at the surface for automatically actuating the said remote control means in response to changes in environmental conditions, whereby hydraulic pressure is applied to said plunger [means] to compress said spring and seat said valve closure in a shut-off position at the lower end of said flow channel.

3. A control valve for use on subsurface well tubing and controllable from the surface by means exterior of said tubing which comprises in combination an elongated housing, tubing threads at both ends of said housing for connecting said housing between spaced lengths of tubing, a single flow channel extending the entire length of said housing, the cross-sectional flow area of said channel being approximately equal to that of said tubing, a generally tubular pocket disposed laterally of said flow channel and fixed to the exterior of said housing, said pocket extending below the flow channel in said housing, an enlargement in said housing below said flow channel providing communication between the lower end of said channel and the lower end of said tubular pocket, a flapper closure means pivotally mounted within said enlargement and movable across the lower end of said flow channel to prevent all flow through said tubing, longitudinally extending rod means movable within said pocket, a linkage operable within said enlargement and connecting the lower end of said rod means with said pivoted closure means, a sleeve-type cylinder threaded into the upper end of said pocket, a plunger means at the upper end of said rod means operating within said cylinder, spring means below said cylinder and within said pocket, an annular shoulder intermediate the ends of said pocket providing a stop for said spring means, said spring means normally raising said plunger means in said sleeve and urging said flapper closure to an open position through said linkage, hydraulic operator means at the surface, a conduit between the operator means and said cylinder within said pocket whereby hydraulic pressure may be applied to said plunger means through said conduit to compress said spring and remotely seat said flapper closure in a shut-off position at the lower end of said flow channel, and means for automatically actuating the hydraulic operator means.

4. The apparatus of claim 3 wherein said hydraulic operator means is responsive to environmental changes at the wellhead.

5. *A controller according to claim 1 wherein said flow channel is substantially co-axial with said tubing.*

References Cited in the file of this patent or the original patent

UNITED STATES PATENTS

| | | |
|---|---|---|
| 1,255,147 | Fletcher | Feb. 5, 1918 |
| 1,932,118 | Oeschsle | Oct. 24, 1933 |
| 2,104,660 | Long et al. | Jan. 4, 1938 |
| 2,351,322 | Crake | June 13, 1944 |
| 2,785,755 | Dean | Mar. 19, 1957 |
| 2,786,535 | Boer et al. | Mar. 26, 1957 |